United States Patent Office 2,862,027
Patented Nov. 25, 1958

2,862,027

PROCESS FOR RECOVERY OF ACIDS

Julian Feldman, Cincinnati, Ohio, assignor to National Distillers and Chemical Corporation, New York, N. Y., a corporation of Virginia No Drawing. Application October 22, 1956
Serial No. 617,218

10 Claims. (Cl. 260—533)

The present invention relates to an improved method for increasing the yield of $C_{10}$ saturated branched chain diacids in crystalline form by crystallization of such diacids from solutions thereof.

In recently discovered processes, butadiene is treated with an alkali metal in finely dispersed form in a selected ether medium and desirably in the presence of a small amount of a polycyclic aromatic hydrocarbon and/or solid attrition agent at a temperature preferably below about 0° C. to produce a mixture predominantly comprised of dialkali metal dimers of butadiene; i. e., dialkali metal octadienes. Such dialkali metal derivatives can then be carbonated, preferably at a temperature below about 0° C., to produce mixtures of dialkali metal salts of diacids having two more carbon atoms per molecule than the dimer of butadiene. Such salts can then be hydrogenated and acidified to provide a mixture of sebacic acid, its isomers 2-ethylsuberic acid and 2,5-diethyladipic acid, and small amounts of other materials including monobasic carboxylic acids.

In further illustration of such a process, butadiene and finely dispersed sodium are reacted in an attrition type apparatus such as a ball mill to form a mixture of disodiooctadienes which are then carbonated to the sodium salts of the corresponding acids (e. g., the sodium salts of unsaturated $C_{10}$ aliphatic dibasic acids). Organic solvents (e. g., ether) are then removed and the organic salts are converted by hydrogenation in aqueous solution to the sodium salts of the corresponding $C_{10}$ saturated acids. Preferably, the saturation of the salts is carried out by a catalytic hydrogenation.

The resulting aqueous mixture contains varying amounts of salts of isomeric $C_{10}$ dicarboxylic acids, including sebacic acid and branched-chain $C_{10}$ diacids as well as small amounts of salts of monobasic acids of varying molecular weight including $C_5$, $C_9$, and higher monobasic acids. There is also present relatively small amounts of impurities such as hydrogenation catalyst, condensed polymeric acids, hydrocarbon materials, unsaturated materials that may have passed through the hydrogenation step without being hydrogenated, and the like. The aqueous reaction mixture is then filtered or centrifuged to remove solids and the filtrate is acidified with a suitable acid (e. g., hydrochloric acid, sulfuric acid, etc.) and, if desired, in presence of a suitable aromatic hydrocarbon (e. g., toluene) whereby to neutralize the organic acid components in the mixture and to provide a hydrocarbon phase containing the bulk of the resulting free acids in solution. Upon removal of the toluene from the hydrocarbon phase, there is provided a crude mixture of acids comprised predominantly of sebacic acid, isomers thereof including 2-ethylsuberic acid and 2,5-diethyladipic acid and, normally, a relatively small amount of unsaturated components, hydrocarbon polymers, and the like. Such crude mixtures of acids, or such mixtures from which the linear sebacic acid is substantially removed, are illustrative of starting materials suitable for practice of this invention whereby to improve the yield and recovery by crystallization of branched chain $C_{10}$ saturated aliphatic diacids present in such mixtures.

In accordance with this invention, a mixture comprised substantially of isomers of sebacic acid and, for example, containing at least about 2 parts of isomeric diacids to one part of sebacic acid, and derived from a process as aforediscussed is subjected, in solution in a suitable solvent or solvent mixture as described more fully hereinafter, to an initial crystallization at a reduced temperature (e. g., about 25° C. or lower) sufficient to crystallize out a mixture comprised substantially of $C_{10}$ diacids thereby leaving a mother liquor containing $C_{10}$ diacids that did not crystallize out under the conditions employed and which mother liquor contains substances such as unsaturated acids, higher molecular weight acids, neutral substances, monobasic acids, etc. that may have been present in the acid mixture subjected to the described initial crystallization. Following substantial removal (e. g., distillation) of the solvent from the mother liquor, the mother liquor is then subjected to an elevated temperature, but below the temperature at which substantial, if any, decomposition of the $C_{10}$ diacid occurs, for a period of time sufficient to convert the $C_{10}$ diacids in the mother liquor to more easily crystallizable $C_{10}$ diacids. Generally, the mother liquor is subjected to an elevated temperature up to about 250° C. for from about one to about six hours, and preferably, for about two hours or more, in an inert atmosphere such as for example nitrogen, argon, helium, carbon dioxide, hydrogen, methane, etc. The thus treated mother liquor can then be dissolved in a suitable solvent, which can be a solvent such as used in the initial crystallization and subjected to a further crystallization by temperature reduction whereby a substantial amount of $C_{10}$ diacids crystallize out; or, if desired, the thus treated mother liquor can be recycled to the acid feed for the initial crystallization. Thus, by the process embodied herein and described more fully hereinafter, the treatment of the mother liquor containing the $C_{10}$ diacids converts a substantial portion of the $C_{10}$ branched-chain diacids, initially non-crystallizable or difficultly crystallizable, to branched-chain diacids that are more easily crystallizable, even under the conditions such as were utilized for the initial crystallization. In an embodiment, the mother liquor from the initial crystallization can be dissolved in an aqueous alkaline solution, such as a caustic solution, in an amount sufficient to provide an aqueous alkaline (e. g., pH of about 11 to about 14) solution of the salts of the diacids in the mother liquor plus excess caustic, e. g., about 10–20% excess over the amount theoretically required for conversion of the acids to salts. Such an aqueous solution can then be subjected, as embodied herein, to an elevated temperature for a period of time sufficient to convert the salts of the $C_{10}$ diacids to salts which, upon neutralization, liberate $C_{10}$ diacids that can be dissolved in a suitable solvent for crystallization and subjected to a reduced temperature whereupon crystallization of $C_{10}$ diacids results. For such an embodiment, the thermal treatment of the aqueous alkaline solution of the diacids from the mother liquor is preferably treated at from about 150 to about 185° C. for about 2 to 12 hours.

With reference to the solvent employed for dissolving the acid mixture to be subjected to the initial crystallization, or for dissolving the acids in the mother liquor for recrystallization, toluene as well as mixtures of toluene with liquid saturated aliphatic hydrocarbons (e. g., hexane) are particularly suitable. However, other substances such as acetonitrile, aqueous acetonitrile, etc. may be used. In general, the solvent or solvent mixtures employed are selected from liquid organic materials that dissolve the acid mixtures and, further, from which dissolved acids crystallize out upon temperature reduction of the solution, as for example, to a temperature of about 25° C. and below. As to preferred embodiments, there is used a combination of (1) a liquid aromatic hydrocarbon that is a solvent for the $C_{10}$ diacids and (2) a non-aromatic liquid hydrocarbon that is a non-solvent for such diacids. Thus, the aromatic solvent may be a material such as toluene, benzene, alkylbenzenes such as ethylbenzene, xylene, and the like as well as materials such as diphenyloxide, phenol, etc. with toluene being particularly suitable. For the non-solvent, a liquid non-aromatic hydrocarbon such as hexane is particularly suitable, although other substances such as octane, cyclohexane, petroleum ethers, heptane, isooctane, etc. may be used and, generally, liquid non-aromatic hydrocarbons of from about 5 to about 12 carbon atoms. Although the proportional amount of the solvent to non-solvent that is used may be varied to meet particular requirements, the combination solvent should contain the aromatic solvent in amount sufficient to solubilize the isomers of sebacic acid at a slightly elevated temperature. For most purposes, a solvent mixture is employed that contains from about 10 to about 30% (by weight) of the aromatic solvent and from about 70 to about 90% of the aliphatic hydrocarbon.

With reference to the treatment of the mother liquor for conversion of the isomers of sebacic acid to isomers that crystallize out under the conditions employed, the mother liquor is subjected to an elevated temperature of up to about 250° C. or more for a period of time usually within the range of about one to about six hours whereby substantial conversion to crystallizable isomers of sebacic acid is effected. A preferred treatment comprises use of a temperature of about 250° C. for four hours for treatment of the mother liquor diacids per se and, for the embodiment relating to use of aqueous alkaline solutions, a temperature of about 180 to 190° C. for about 2 to 3 hours.

In order to illustrate the invention, but without intent of limitation, the following embodiments are set forth.

*Example 1*

An acid mixture having a neutralization value of 106 (theoretical value for $C_{10}$ aliphatic saturated diacids=101.12) was prepared by the aforedescribed series of reactions, starting with reaction of butadiene and finely divided sodium and by carrying out the neutralization step in presence of toluene whereby a toluene phase was obtained containing in solution sebacic acid, isomers of sebacic acid, and a small amount of monobasic acids, diacids higher than $C_{10}$, unsaturated $C_{10}$ acids, etc. In such a mixture, the sebacic acid was present in a weight ratio of about 35 parts to 65 parts of its isomer (2-ethylsuberic acid (50 parts) and 2,5-diethyladipic acid (15 parts)). Following removal of the toluene and distillation of the resulting acid mixture to remove a light end (monobasic acid) and a residue fraction, there was obtained an acid mixture of 103 neutralization value and containing about 98% of $C_{10}$ diacids which was utilized as the starting acid mixture for this example.

Two hundred pounds of toluene and 104.6 pounds of the acid mixture were charged to a kettle and heated under reflux conditions (110° C.) and maintained thereat for 20 minutes. The resulting solution was cooled to 25° C. over a period of one hour and held at 25° C. for four hours whereby substantially all of the sebacic acid precipitated out of solution and was recovered by filtration, leaving a toluene filtrate containing diethyladipic acid and 2-ethylsuberic acid in a weight ratio of 1 to about 3.5 parts by weight. The filtrate was adjusted in solvent content to provide a liquid composition comprising about a 30% concentration of such isomers of sebacic acid in a solvent medium of 20 parts of toluene to 80 parts of hexane. The resulting composition was then cooled to 10° C. and held at that temperature for one hour whereby crystallization of $C_{10}$ diacids occurred. The crystallized acids were then removed by filtration leaving a mother liquor comprising in solution in toluene-hexane a mixture of diethyladipic acid and 2-ethylsuberic acid in approximately equal parts plus a small amount of other materials as aforedefined and present in the starting acid mixture.

The mother liquor, following removal of the toluene and hexane by distillation, was then heated at 250° C. for four hours under a nitrogen atmosphere following which the thermally treated acid mixture was dissolved in a mixture comprising 20% toluene and 80% hexane. The resulting solution was then cooled to 10° C. and held at that temperature for four hours whereupon 42% of the $C_{10}$ diacids in the mother liquor crystallized out. The crystals were separated from the mother liquor by filtration and upon analysis were identified as isomers of sebacic acid.

*Example 2*

A mother liquor, obtained as described in Example 1 by crystallization of the acid mixture from a hexane-toluene solution, was subjected to a distillation to remove the toluene-hexane. The resultant substantially solvent-free mother liquor was then dissolved in 20% caustic providing an aqueous solution having a pH of 14. The alkaline aqueous solution was then heated for two hours at 185° C., followed by neutralization of the thus-treated solution with sulfuric acid. The resulting solution was then acidified in presence of toluene to a pH of 2.0. The resulting toluene solution was then washed, dried, and concentrated to a composition of about two parts of acid per one part of toluene. This solution was then mixed with hexane in an amount to provide a 30% solution of acids in the solvent following which the solution was cooled to 10° C. for four hours. Fifteen percent by weight of the $C_{10}$ diacids crystallized out and were identified as branched chain isomers of sebacic acid.

*Example 3*

A mother liquor (N. E.=116.6, iodine No.=15.8) was obtained from an acid mixture, such as used in Example 1, by crystallization of the mixture from a hexane-toluene solution. The mother liquor, following removal of the toluene-hexane, was flash distilled to provide a flash distilled mother liquor (about 90% $C_{10}$ diacids) having a neutralization equivalent of 112.6 and iodine No. of 17.4.

(A)

One portion of the flash distilled mother liquor, as a 33% solution of mother liquor in a 20 toluene-80 hexane mixture was cooled to 5° C. and held thereat for forty hours. Five percent of the $C_{10}$ diacids crystallized out as crystals having a melting point of 69–90° C. and neutralization equivalent of 102.

(B)

Another portion of the flash distilled mother liquor was subjected to the identical set of crystallization conditions except that, instead of keeping the toluene-hexane solution at 5° C. for 40 hours, it was kept at that temperature for a shorter period of time (24 hours). Additionally, and prior to effecting the crystallization by temperature reduction of 5° C. for 24 hours, the flash distilled liquid was heated for four hours at 250° C. Whereas without such a heat treatment, only 5% of the $C_{10}$ diacids crystallized out, 12.6% of $C_{10}$ diacids (102 neutralization equivalent; M. P. 100 to 120° C.) crystallized out from the heat-treated portion.

(C)

The mother liquor from the crystallization of the heat-treated portion (B) was heated for four hours at 250° C.

and cooled to 5° C. for 24 hours whereupon an additional 9% of $C_{10}$ diacids crystallized out (M. P. 88–110° C.)

(D)

The mother liquor from (C) was treated in the same manner as was the mother liquor in (B) whereupon an additional 4.7% of $C_{10}$ diacids crystallized out (M. P. 63–115° C., neutralization equivalent 102).

As is apparent from the foregoing illustrative embodiments, the described treatment of the mother liquor from the initial crystallization resulted in conversion of a substantial amount of the $C_{10}$ diacids that did not crystallize out in the initial crystallization to $C_{10}$ diacids that crystallized out under similar crystallization conditions following the described treatment of the mother liquor. In further embodiments, the process can be carried out by use of a series of crystallizations whereby the mother liquor from each crystallization can be treated for solvent removal, dissolution in a suitable solvent mixture and subjected to recrystallization whereby, from the mother liquor from the initial crystallization, each treatment results in conversion of diacids to more easily crystallizable form with ultimate recovery of $C_{10}$ diacids in improved yield by the described crystallizations.

In still other embodiments, the process is carried out as aforedescribed but in which a slip stream is removed from the mother liquor, as for example about ⅓ of the mother liquor prior to subjecting the mother liquor to the described thermal treatment. Such an embodiment is particularly useful when it is desired to prevent build-up of monobasic acids and neutral compounds from the system. In such a case, and described in application of the process embodied herein to the aforedescribed reaction between butadiene and alkali metal to prepare dialkali octadienes followed by carbonation, hydrogenation and neutralization, such a slip stream can be subjected to solvent extraction for removal of monobasic acids, neutral compounds, etc. For such an embodiment, illustrated by use of a hexane-aqueous acetonitrile mixture for the selective extractions, the monobasic acids and neutral compounds are extracted by the hexane. The raffinate, following removal of the acetonitrile, can then be dissolved in alkali to pH of 11.5, and the resulting composition recycled to the hydrogenation step of the aforedescribed process. Thus, unsaturated materials that may be present in the slip stream are resubjected to hydrogenation and polymer materials are removed by subsequent distillation whereby build-up of unsaturates and polymers in the system are obviated or substantially minimized.

The following is a specific illustration of such an embodiment:

(1) A slip stream of the mother liquor recycle containing toluene, $C_{10}$ dibasic acids, neutrals, unsaturates, monobasic acids boiling in the $C_{10}$ dibasic acid range and high boiling residues, is collected and steam stripped in a batch distillation system to remove toluene.

(2) The steam stripped mother liquor slip stream is dissolved in hot aqueous acetonitrile and agitated with an equal volume of hexane.

(3) The mixture is allowed to settle and the hexane layer containing monobasic acids and neutrals is decanted. If monobasic acid removal is not sufficiently complete, the aqueous acetonitrile mixture is again agitated with an equal volume of hexane, settled and decanted.

(4) The acetonitrile water azeotrope is distilled from the aqueous $C_{10}$ dibasic acids. The $C_{10}$ dibasic acid aqueous residue is then neutralized with caustic to solubilize the dibasic acids, and the aqueous sodium salts are recycled to the hydrogenation step of the aforedescribed process for hydrogenation of unsaturates and the described recovery of the $C_{10}$ dibasic acids.

Although the process embodied herein has been described with reference to specific methods for obtaining the mixture of sebacic acid and isomers from which the mother liquor is obtained, it should be understood that such mixtures of isomeric material may be obtained by other methods. For example, such mixtures can be obtained by separation processes as described in U. S. Patent No. 2,749,364 of June 5, 1956, and in copending application S. N. 586,855, filed May 23, 1956, and S. N. 544,826, filed November 3, 1955.

In still other embodiments, the process can be carried out in a cyclic process in which the mixture of isomeric acids in the described solvent is subjected to an initial crystallization followed by removal of the crystallized acids, thermal treatment of the resulting mother liquor under the conditions described herein for substantial conversion of the $C_{10}$ diacids in the mother liquor to more easily crystallized diacids, and recycle of the thus treated mother liquor to the mixture subjected to the initial crystallization. Such an embodiment can be carried out by recycling all of the mother liquor but, preferably, a slip stream of the mother liquor is removed (prior to the thermal treatment thereof) for use as a slip stream for treatment to prevent build-up of monobasic acids and neutral compounds as aforedescribed, and the remainder of the mother liquor utilized for the described thermal treatment and recycle to the composition subjected to the initial crystallization.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process for preparation and recovery of saturated aliphatic $C_{10}$ diacids wherein butadiene is initially reacted with a finely divided alkali metal to form a mixture of isomeric dialkali metal octadienes, the mixture of said octadienes is carbonated to produce an isomeric mixture of dialkali metal salts of $C_{10}$ unsaturated aliphatic diacids, said mixture of isomeric salts is hydrogenated to form the corresponding mixture of saturated salts, the resulting mixture of saturated salts is acidified to liberate the isomeric mixture of $C_{10}$ diacids including sebacic acid, 2-ethylsuberic acid and 2,5-diethyladipic acid, and recovery of said diacids by crystallization from a solution thereof, the improvement for obtainment of increased recovery of said diacids by crystallization which comprises subjecting the liberated mixture of isomeric $C_{10}$ diacids, dissolved in an organic solvent for said diacids and from which solution crystallization of a substantial portion of the $C_{10}$ diacids occurs at a reduced temperature, to a reduced temperature sufficient to crystallize out a substantial portion of the $C_{10}$ diacids thereby providing a mother liquor containing branched chain isomers of sebacic acid, and subjecting said mother liquor to an elevated temperature of not more than about 250° C. for a period of time sufficient to convert a substantial portion of the $C_{10}$ diacids in said mother liquor to more easily crystallizable $C_{10}$ diacids.

2. A process, as defined in claim 1, wherein the mother liquor is subjected to said elevated temperature for from about one to about six hours.

3. A process, as defined in claim 2, wherein the mother liquor is subjected to the described treatment in an inert atmosphere.

4. A process, as defined in claim 1, wherein, following the treatment at an elevated temperature, the resultant mother liquor is dissolved in an organic solvent from which $C_{10}$ diacids in the mother liquor crystallize out at a reduced temperature, and the resulting solution of the treated mother liquor is reduced to a temperature sufficient to crystallize out $C_{10}$ diacids.

5. A process, as defined in claim 1, wherein the mother liquor, following the treatment at an elevated temperature, is recycled to the crystallization step.

6. A process, as defined in claim 1, wherein the mother liquor is dissolved in an alkaline solution, the resulting alkaline solution of mother liquor is subjected to an elevated temperature of not more than 250° C. for a period of time sufficient to convert a substantial portion of the salts of $C_{10}$ diacids in said mother liquor to salts of more easily crystallizable $C_{10}$ saturated diacids, acidifying the resultant salts to liberate the $C_{10}$ diacids, and recycling said liberated $C_{10}$ diacids to the crystallization step.

7. A process, as defined in claim 1, wherein a portion of the mother liquor from the crystallization step, prior to subjecting the mother liquor to the treatment at an elevated temperature, is solvent extracted with an organic solvent selective for extraction of monobasic acids, the resulting raffinate containing the non-extracted $C_{10}$ diacids is neutralized, and the resulting neutralized $C_{10}$ diacids are recycled to the hydrogenation step.

8. A process, as defined in claim 1, wherein the mixture of liberated $C_{10}$ diacids is subjected to crystallization to remove substantially all of the sebacic acid thereby leaving a mother liquor comprised substantially of branched chain isomers of sebacic acid for the treatment at the elevated temperature.

9. In a process for preparation and recovery of saturated aliphatic $C_{10}$ diacids wherein butadiene is initially reacted with finely divided sodium to form an isomeric mixture of disodiooctadienes, the isomeric mixture is carbonated to produce an isomeric mixture of disodio salts of $C_{10}$ unsaturated aliphatic diacids, said mixture of salts is hydrogenated in aqueous solution to the corresponding mixture of saturated salts, the resultant aqueous mixture of saturated salts is acidified in presence of toluene to liberate the $C_{10}$ diacids thereby forming a toluene phase containing the bulk of the liberated organic acids including sebacic acid, 2-ethylsuberic acid and 2,5-diethyladipic acid, the improvement for obtainment of increased recovery of said acids by crystallization which comprises subjecting said mixture of liberated acids in toluene solution to a reduced temperature of not higher than about 25° C. for a period of time sufficient to crystallize out a substantial amount of the acids including substantially all of the sebacic acid leaving a mother liquor containing 2,5-diethyladipic acid, and heating the resultant mother liquor at an elevated temperature of not more than about 250° C. for from about one to six hours thereby converting a substantial portion of the $C_{10}$ diacids in the mother liquor to more easily crystallizable $C_{10}$ diacids.

10. A method for obtaining $C_{10}$ diacids in crystalline form in increased yields from mixtures comprising sebacic acid, 2-ethylsuberic acid and 2,5-diethyladipic acid which comprises dissolving said mixture in an organic solvent for said acids and from which a substantial portion of the diacids are crystallized out upon reduction of the solution to a temperature not exceeding about 25° C., reducing the temperature of said solution to a temperature not higher than about 25° C. to crystallize out a substantial amount of said $C_{10}$ diacids thereby providing a mother liquor containing 2,5-diethyladipic acid, and subjecting said mother liquor to an elevated temperature of not more than about 250° C. for a period of time sufficient to convert a substantial portion of the $C_{10}$ diacids in said motor liquor to more easily crystallizable $C_{10}$ diacids.

References Cited in the file of this patent

UNITED STATES PATENTS

| 2,352,461 | Walker | June 27, 1944 |
| 2,680,713 | Lindsey et al. | June 8, 1954 |
| 2,749,364 | Greenberg | June 5, 1956 |
| 2,773,092 | Carley et al. | Dec. 4, 1956 |

OTHER REFERENCES

Tipson: Tech. of Org. Chem., volume III (edited by Weissberger) (1950), pp. 481–2, 420–26.

Groggins: Unit Processes in Organic Synthesis (1952), pp. 488–92.